Patented Aug. 19, 1941

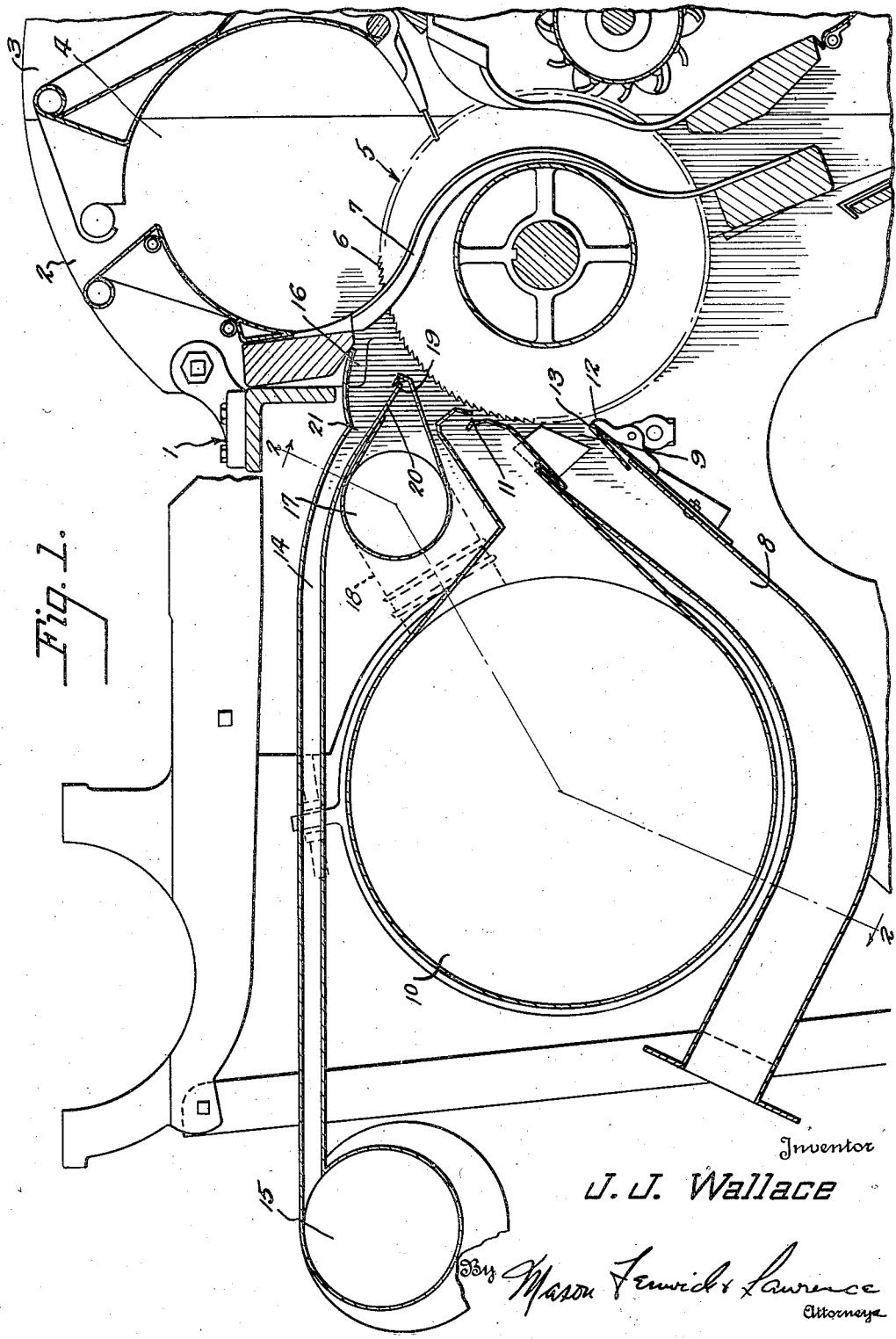

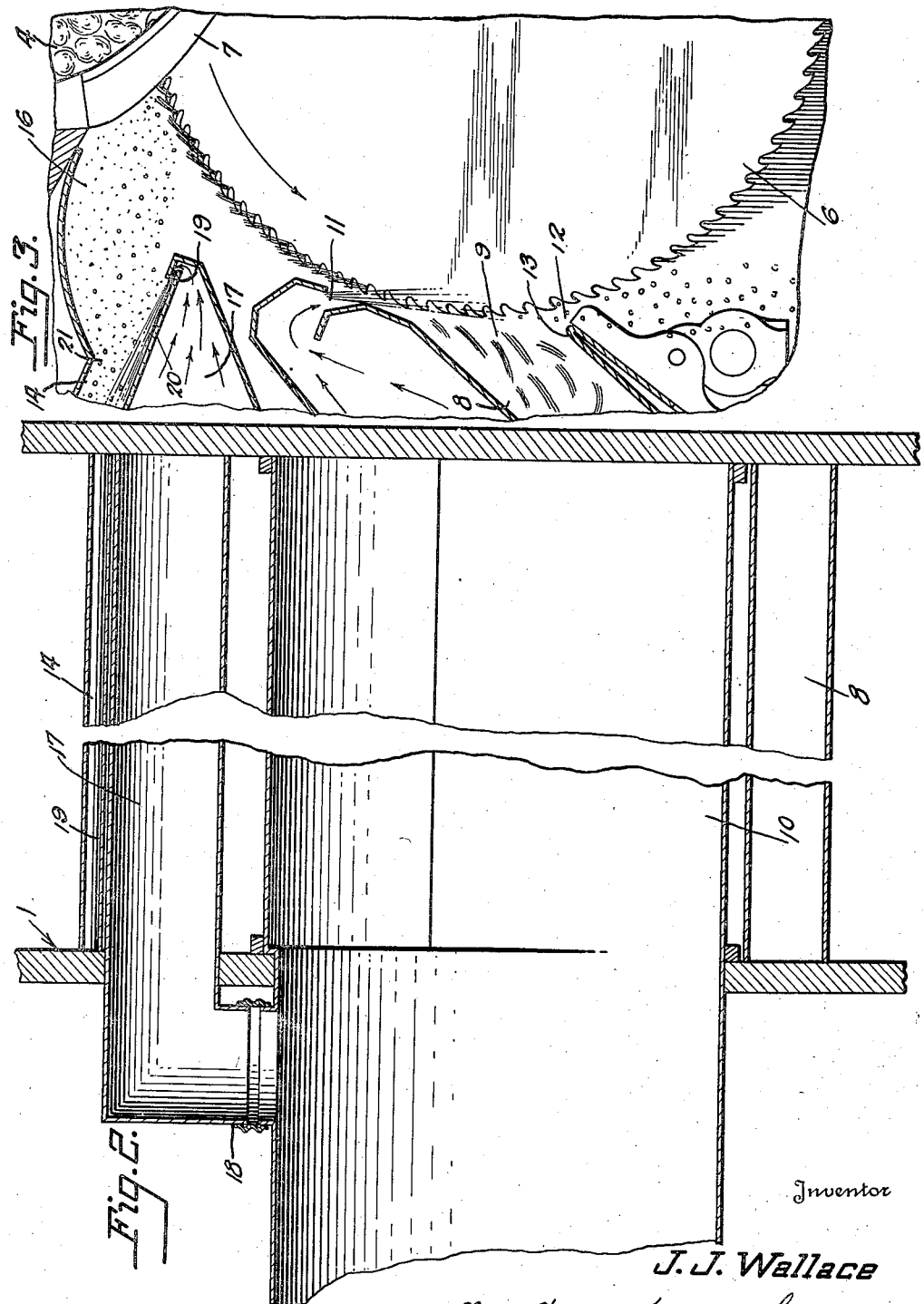

2,253,456

UNITED STATES PATENT OFFICE 2,253,456

AIR BLAST GIN WITH PNEUMATIC MOTE DISCHARGE

Jeffrey J. Wallace, Amite, La., assignor to Gullett Gin Company, Amite, Parish of Tangipahoa, La., a corporation of Louisiana Application December 6, 1940, Serial No. 368,939

3 Claims. (Cl. 19—58)

This invention relates to cotton gins of the air blast type, and has for its general object the provision of a system of dual moting, providing for the pneumatic removal of motes and trash drawn off centrifugally from the saws above the lint flue, and for the gravitational removal of the motes freed when the lint is removed from the saws by the air blast at the mouth of the lint flue, and for overcoming the down draft incident to the rotation of the saws, which ordinarily would draw some of the lighter centrifugally thrown trash and dust, into the lint flue.

Another object of the invention is to provide a pneumatic moting system above the lint flue, including a mote discharge duct having a flaring mouth confronting the saws to catch the motes and trash thrown centrifugally from the saws, with provisions for producing a sheet-like air current along the floor or lower side of said flared mouth, blowing away from the saws toward the convergent portion of said duct, and being in the trajectory path of the heavier motes and particles, for catching said particles and discharging them by way of said duct, and by its venturi action, creating suction in said flared mouth above said sheet-like air current, drawing out and discharging the lighter trash and dust suspended in the atmosphere within said flared mouth, and countering the down draft produced by the rotation of the saws which would otherwise tend to draw said lighter stuff down into the lint flue.

Other objects of the invention will appear as the following description of a preferred and practical embodiment thereof proceeds.

The drawings which accompany and form a part of the following specification illustrate the inventive concept in connection with a gin of the huller type. However, it is to be understood that the invention is useful in association with any type of air blast gin employing a saw cylinder.

In the drawings throughout the several figures of which the same characters of reference have been employed to designate identical parts:

Figure 1 is a vertical side section through a cotton gin embodying the principles of the invention;

Figure 2 is a section taken along the line 2—2 of Figure 1; and

Figure 3 is an enlarged section of the nozzle structure with reference to the saws.

Referring now in detail to the several figures, the numeral 1 represents the gin frame upon which are mounted the inner and outer breasts 2 and 3, which together form the roll box 4. The saw cylinder 5, driven in the direction indicated by the arrow, is composed of a plurality of saws 6, which in the cycle of rotation of the saw cylinder pass through the roll box 4 and between the ginning ribs 7.

A lint discharge flue 8 is provided, terminating in an open mouth 9 which extends throughout the length of the saw cylinder and is arranged closely adjacent thereto, but spaced from the ribs a sufficient distance to provide for the centrifugal discharge of motes and trash carried on the lint mass adherent to the saw cylinder before said motes and trash reach the mouth of the lint flue.

The gin is provided with an air duct 10, through which air under pressure is supplied to the lint removing nozzle 11, said nozzle likewise extending longitudinally of the saw cylinder. The nozzle 11 is directed downwardly, that is to say, in the direction of rotation of the saw cylinder, tangentially to the periphery of the latter, and in the general direction of the sloping surfaces of the saw teeth, its function being to direct a blast of air against the saw teeth in a direction to remove the lint from said saw teeth and to blow it into the lint flue from which it is discharged.

The bottom wall of the lint flue is spaced a short distance from the saw cylinder at the point designated by the reference character 12, and has an adjustable edge portion 13 which can be moved so as to enlarge or decrease the opening 12. The opening 12 functions as a gravitational mote discharge.

At this point it may be well to consider lint and mote conditions as they exist on the saw cylinder in various phases of its cycle of rotation. During the sojourn of saws in the roll box, motes and trash are picked up in the roots of the saw teeth. These become overlain with the layer of lint, and more motes and trash collect on the lint, so that when the saws emerge from between the ginning rib 7, they carry a mass of motes and trash on top of the lint which can be readily removed by centrifugal force and another mass of motes and trash in the roots of the teeth, and which can only be removed subsequently to the removal of the lint itself from the saw cylinder. The accumulation of lint on the saw cylinder produces friction between the saw cylinder and the surrounding air, setting the latter in motion, so that a down draft accompanies the rotation of the saw cylinder.

So much of the structure as has been described up to this point is conventional with known cotton gins. Upon emergence of the saw cylinder from the ribs 7, the motes and trash on the outside of the lint fly off centrifugally, the lint is removed by the blast from the nozzle 11, and discharged by way of the lint flue 8, while the motes in the roots of the saw teeth, freed by the removal of the lint drop by gravity through the opening 12.

In practice, no efficient means has heretofore been devised for disposing of the motes and trash that fly off by centrifugal force, and particularly the lighter particles which do not settle at once, but remain suspended in the air above the nozzle 11. Usually a deflector board has been provided against which the heavier centrifugally thrown motes and trash impinge, and from which they rebound back into the path of rotation of the periphery of the saw, passing down between the nozzle 11 and the saw cylinder, and discharging gravitationally. The finer particles, however, have heretofore been caught in the down draft created by the rotation of the saw cylinder, and have been carried down into the region of the mouth of the lint flue 8 and blown into said flue to mix with the lint.

By the present invention I have provided a pneumatic system for apprehending both the heavier and lighter centrifugally discharging particles at a point above the lint flue and carrying them off. In the embodiment shown, the pneumatic system of mote and trash discharge comprises a mote duct 14 connected at its posterior end with any suitable mote and trash eduction manifold 15. The mote duct 14 is relatively narrow in a vertical direction throughout the major portion of its length, but flares at its anterior end, forming an expanded mouth 16 which extends lengthwise of the saw cylinder, and having its open forward end confronting the saw cylinder in that region in which the motes and trash carried by the lint on the saw cylinder are centrifugally thrown off. An air conduit 17 is suitably connected as by the pipe 18 to the air conduit 10, and terminates adjacent the open end of the expanded mouth in a nozzle 19 extending substantially the length of the saw cylinder, being directed away from the saw cylinder and into said expanded mouth adjacent the lower side 20 thereof, said nozzle being so shaped as to blow a sheet-like jet of air along the lower side of the mouth 16 and into the narrow portion of the mote duct. Said sheet-like jet of air is in the trajectory path of the heavier motes and trash thrown off by the saw cylinder, and serves as a vehicle for discharging said heavier motes and trash through the mote duct and out into the manifold 15.

The sheet-like jet of air passing from the expanded mouth of the mote duct into the narrow portion thereof creates a Venturi action at the throat 21 between the expanded mouth and the narrow portion of the mote duct which draws into said mote duct the lighter trash and dust which does not immediately fall into the sheet-like air current from the nozzle 19 but remains suspended in the atmosphere in the expanded mouth 16 above said sheet-like air current. This Venturi suction counteracts the down draft created by the rotation of the saw cylinder, and which if not nullified would draw the suspended finer trash and dust past the nozzle 11 and into the mouth 9 of the lint flue, where it would be discharged with the lint.

In combination with the gravitational lint downward opening 12, or its equivalent, the pneumatic system of the present invention provides complete and efficient mote elimination for any type of air blast gin. The motes and lighter trash and dust centrifugally thrown from the lint, are disposed of at a point in the rotation of the saw cylinder anterior to the region at which the lint is removed, there being no chance for the motes or finer material to recontaminate the lint at the mouth of the lint flue, this being particularly safeguarded through the counteracting of the down draft produced by the rotation of the saw cylinder. This pneumatic system, of course, removes only the motes and trash which are on top of or loosely adherent in the lint body on the saw cylinder. Removal of the lint at the mouth of the lint flue frees the motes and trash which have been lodged at the roots of the saw teeth, so that these discharge by gravity through the opening 12.

While I have in the above description disclosed what I believe to be a preferred and practical embodiment of the invention, it will be understood to those skilled in the art that the details of construction and the arrangement of parts as shown and described are by way of example and not to be construed as limiting the invention defined in the appended claims.

What I claim as my invention is:

1. An air blast gin of the type having a saw cylinder operating in conjunction with a roll box and ginning ribs, having a lint discharge flue with its mouth in proximity to the periphery of the saw cylinder at a point sufficiently distant from said ribs to provide an intervening space for the centrifugal discharge of the motes and trash carried on the lint mass adherent to the saw cylinder, and having a lint removing blast nozzle adjacent the mouth of the lint flue in combination with a pneumatic moting system including a mote discharge duct having a relatively narrow portion debouching into a flared mouth defined between divergent upper and lower walls, confronting said saw cylinder in the region of centrifugal mote discharge, a nozzle having a linear orifice along the lower edge of said lower wall directed away from said saw cylinder for blowing a sheet-like blast along said lower wall and into said mote duct, said orifice lying approximately in a horizontal plane embracing the line of intersection of said saw cylinder with said ribs, said lower wall and said sheet-like blast being in the path of direct impingement of the centrifugally discharged particles, said blast by Venturi action creating suction in said flared mouth for evacuating the lighter suspended trash by way of said mote duct, and countering the down draft produced by rotation of the lint-laden saw cylinder, which would otherwise draw said lighter trash into said lint flue.

2. An air blast gin of the type having a saw cylinder operating in conjunction with a roll box and ginning ribs, having a lint discharge flue with its mouth in proximity to the periphery of the saw cylinder at a point sufficiently distant from said ribs to provide an intervening space for the centrifugal discharge of the motes and trash carried on the lint mass adherent to the saw cylinder, and having a lint removing blast nozzle adjacent the mouth of the lint flue in combination with a pneumatic moting system including a mote discharge duct having a relatively narrow portion debouching into a flared mouth defined between divergent upper and lower walls, confronting said saw cylinder in the region of centrifugal mote discharge, a nozzle having a linear orifice along the lower edge of said lower wall directed away from said saw cylinder for blowing a sheet-like blast along said lower wall and into said mote duct, said orifice lying approximately in a horizontal plane embracing the line of intersection of said saw cylinder with said ribs, said lower wall being inclined upwardly away from said saw cylinder at a wide angle with respect to said plane, said lower wall and said sheet-like blast being in the path of direct impingement of the centrifugally discharged particles, said blast by Venturi action creating suction in said flared mouth for evacuating the lighter suspended trash by way of said mote duct, and countering the down draft produced by rotation of the lint-laden saw cylinder, which would otherwise draw said lighter trash into said lint flue.

3. An air blast gin of the type having a saw cylinder operating in conjunction with a roll box and ginning ribs, having a lint discharge flue with its mouth in proximity to the periphery of the saw cylinder at a point sufficiently distant from said ribs to provide an intervening space for the centrifugal discharge of the motes and trash carried on the lint mass adherent to the saw cylinder, and having a lint removing blast nozzle adjacent the mouth of the lint flue in combination with a pneumatic moting system including a mote discharge duct having a relatively narrow portion debouching into a flared mouth defined between divergent upper and lower walls, confronting said saw cylinder in the region of centrifugal mote discharge, a nozzle having a linear orifice along the lower edge of said lower wall directed away from said saw cylinder for blowing a sheet-like blast along said lower wall and into said mote duct, said orifice lying approximately in a horizontal plane embracing the line of intersection of said saw cylinder with said ribs, said lower wall and said sheet-like blast being in the path of direct impingement of the centrifugally discharged particles, said blast by Venturi action creating suction in said flared mouth for evacuating the lighter suspended trash by way of said mote duct, and countering the down draft produced by rotation of the lint-laden saw cylinder, which would otherwise draw said lighter trash into said lint flue, and means below the region of lint removal comprising an opening at the lower side of the lint flue adjacent the saw cylinder, permitting gravitational discharge of the motes freed by removal of the lint.

JEFFREY J. WALLACE.